C. WILLARD.
HAY SPREADING MACHINE.
No. 49,021. Patented July 25. 1865.
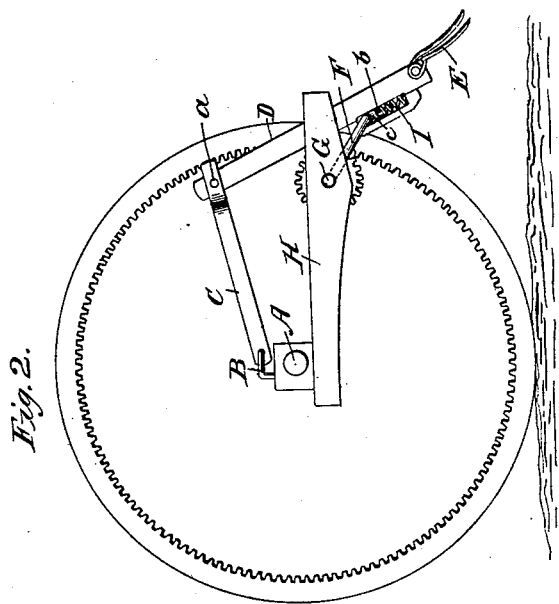
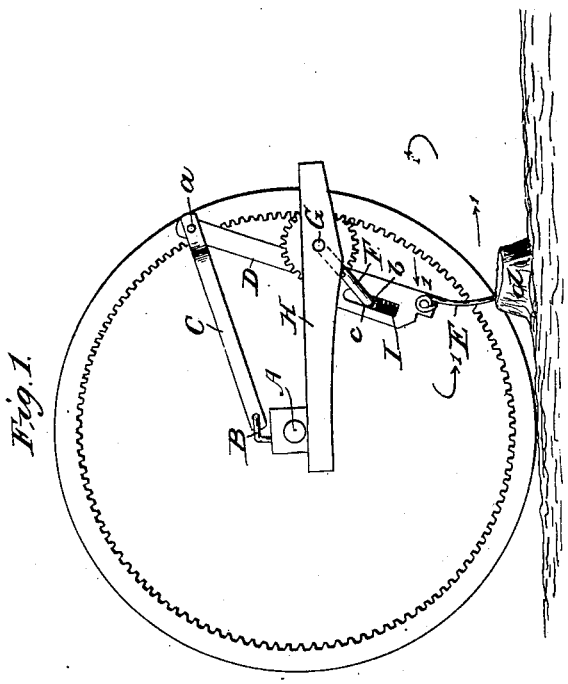

UNITED STATES PATENT OFFICE.

CHARLES WILLARD, OF NEWTOWN, PENNSYLVANIA.

IMPROVEMENT IN HAY-SPREADING MACHINES.

Specification forming part of Letters Patent No. 49,021, dated July 25, 1865.

*To all whom it may concern:*

Be it known that I, CHARLES WILLARD, of Newtown, in the county of Bucks and State of Pennsylvania, have invented a new and Improved Machine for Spreading or Tedding Hay; and I do hereby declare that the following is a full, clear, and exact description thereof, which will enable those skilled in the art to make and use the same, reference being had to the accompanying drawings, forming part of this specification, in which—

Figures 1 and 2 are side views of my invention.

Similar letters of reference indicate corresponding parts.

This invention relates to a new and improved machine for spreading or tedding hay; and it consists in a novel connection of the cranks of the machine to the fork-bars of the same, whereby the forks are allowed to come in contact with obstructions and pass over the same without being liable to be broken or injured.

A represents the axle of the machine, having a wheel at each end, and upon it a rod, B, on which a series of arms, C, are placed loosely, so as to work or turn thereon. These arms C are connected at their outer ends to bars D by pivots $a$, and to the lower ends of the bars D forks E are attached, as shown clearly in both figures. At the rear side of each fork-bar D there is an oblong slot or opening, $b$, in which the cranks F of the crank-shaft G are fitted, the bearings of said shaft being in the frame H of the machine, and the shaft rotated by gearing from one or both of the wheels on which the machine is mounted, as shown in red in both figures. The cranks F bear upon slides $c$, which are allowed to work freely in the slots $b$ of the fork-bars, and each slide has a spiral spring, I, bearing against its under side, which springs have a tendency to keep the forks E down to their work.

As the machine is drawn along the fork-bars D, under the action of the cranks F, are moved in the direction indicated by the arrows 1, so as to act upon the hay and spread or turn it, and in case a fork, E, meets with an obstruction, as shown at $d$ in Fig. 1, its crank F is allowed to continue its movement or complete its revolution, and the fork-bar allowed to rise, if necessary, by the compression of the spring I; hence the fork will not be injured in the least. The several fork-bars, it will be seen, are all allowed this adjusting movement independently one of the other, and the machine may therefore be used to advantage on ground imperfectly cleared of obstructions, such as stones, stumps, &c.

Only one fork-bar, fork, and crank are shown in the drawings. This is deemed to be sufficient, as they are all arranged precisely alike.

I do not claim the fork-bars operated by cranks from a revolving shaft for tedding or spreading hay, for that has been previously used; but I do claim as new and desire to secure by Letters Patent—

The application to the cranks F of the springs I and slides $c$, fitted in slots or openings $b$ in the fork-bars D, to operate in the manner substantially as and for the purpose set forth.

CHAS. WILLARD.

Witnesses:
GEO. A. JENKS,
OWEN WORSTALL.